United States Patent

Masuzawa et al.

[11] Patent Number: 5,821,710
[45] Date of Patent: Oct. 13, 1998

[54] BRUSHLESS MOTOR HAVING PERMANENT MAGNETS

[75] Inventors: Masahiro Masuzawa, Fukaya; Noriyoshi Hirao, Yorii-machi; Takashi Sasaki; Masahiro Mita, both of Fukaya, all of Japan

[73] Assignee: Hitachi Metals, Ltd., Tokyo, Japan

[21] Appl. No.: 933,968

[22] Filed: Sep. 19, 1997

[30] Foreign Application Priority Data

Sep. 30, 1996 [JP] Japan .................................... 8-258711
Jan. 30, 1997 [JP] Japan .................................... 9-015817
Jul. 25, 1997 [JP] Japan .................................... 9-199727

[51] Int. Cl.$^6$ ............................ H02K 7/12; H02K 21/14
[52] U.S. Cl. ......................... 318/254; 318/538; 318/715; 310/191
[58] Field of Search ..................................... 318/138, 254, 318/439, 538, 700, 705, 712, 715; 310/114, 152, 156, 179, 191

[56] References Cited

U.S. PATENT DOCUMENTS 4,739,201 4/1988 Brigham et al. .
5,281,879 1/1994 Satake et al. .

FOREIGN PATENT DOCUMENTS 7-236259 9/1995 Japan .
8-331784 12/1996 Japan .

Primary Examiner—Bentsu Ro
Attorney, Agent, or Firm—Finnegan, Henderson, Farabow, Garrett & Dunner

[57] ABSTRACT

A brushless motor having permanent magnets that can be used as a prime mover for automobiles, in place of internal combustion engines, since the motor can yield high torque during low-speed rotation, as in the case of conventional types of brushless motors and can be used at high torque and with excellent motor efficiency at rotations three times as high as that of conventional types.

The brushless motor having permanent magnets according to the invention comprises a stator having a plurality of stator magnetic poles and a winding for generating a rotating field in the stator magnetic poles, a rotor having a rotating shaft and field permanent magnets rotating with respect to the stator magnetic poles, a control circuit for detecting the position of magnetic poles of the field permanent magnet with respect to the stator and feeding current to the winding in accordance with the position; wherein the field permanent magnets comprise a first field permanent magnet having magnetic poles of different polarities alternately arranged in the direction of rotation, and a second field permanent magnet that is adapted to be rotatable with respect to the first field permanent magnet and has magnetic poles of different polarities alternately arranged in the direction of rotation; the first and second field permanent magnets facing the stator magnetic poles, and a mechanism for changing the phase of the synthesized magnetic poles of the first and second field permanent magnets in accordance with the rotation of the rotor is provided.

7 Claims, 8 Drawing Sheets

BRUSHLESS MOTOR HAVING PERMANENT MAGNETS

DETAILED DESCRIPTION OF THE INVENTION

Background of the Invention

1. Field of the Invention

The present invention relates to a brushless motor having permanent magnets that is useful as an electric motor for applications such as a prime mover for electric cars, etc.

2. Description of the Related Art

In internal combustion engines for automobiles, etc., the range of rotation for generating high torque is extremely limited. As shown in FIG. 11, therefore, transmission gear comprising gears of several different gear ratios is used so that the vehicle can be run at any speeds ranging from low to high speeds.

The relationship between the rotation and torque of a prior-art brushless d-c electric motor using permanent magnets, however, is an inversely proportional relationship; the torque linearly decreases with increases in the number of rotations, as shown in FIG. 12. When the voltage applied to an electric motor is V, the total magnetic flux obtained by multiplying the intensity of magnetic filed of the motor by the effective area of the field is $\Phi$, the number of turns of an armature winding is Z, and the resistance of the armature is R, the maximum number of rotations ($n_{max}$) is $V/\Phi Z$, and the maximum torque ($T_{max}$) is $\Phi ZV/R$. When the voltage is increased twice, both the maximum torque and the maximum number of rotations also increase twice. By changing the number of turns of the winding, the maximum torque and the maximum number of rotations can also be changed. Although the torque increases with increases in the total magnetic flux $\Phi$, the upper limit of the total magnetic flux $\Phi$ must be determined taking into account magnetic saturation on the armature.

In a prior-art brushless d-c motor where high torque can be obtained at low rotation ranges, it is difficult to accomplish high-speed rotation because the variable range of rotation is limited. Consequently, the field weakening technique in which the total magnetic flux $\Phi$ is lowered to increase the maximum number of rotations ($n_{max}$) to achieve high-speed rotation has often been employed. With this technique, the torque as shown by a solid line in FIG. 12 is obtained by setting the total magnetic flux $\Phi$ to a large value during low-speed rotation, while a characteristic shown by a broken line in FIG. 12 is obtained by setting the total magnetic flux $\Phi$ to a smaller value to achieve high-speed rotation.

A method of changing the total magnetic flux dependently on the number of rotations has also been proposed for generators. In "Permanent Magnet Type Generator" disclosed in JPA No. Hei-7(1995)-236259, a permanent magnet type generator for generating electromotive force in a stator by means of the magnetic fluxes flowing from a plurality of poles of a field permanent magnet used in a rotor is provided; the generator comprising a magnetic flux bypassing permanent magnet of the same number of poles as the aforementioned field permanent magnet, rotatably disposed on the same shaft in the proximity of the side of the aforementioned field permanent magnet, and a governor mechanism that is designed to shift the position thereof with increases in the rotation of the rotor; the magnetic flux bypassing permanent magnet being caused to rotate by a half cycle of magnetic polarity in accordance with the displacement of the governor mechanism so that the magnetic polarity of the magnetic flux bypassing permanent magnet is oriented to the same polarity as that of the field permanent magnet when the rotor is stopped, and rotated to the position of the opposite polarity to that of the field permanent magnet by the governor mechanism during high-speed operation. In this way, the output of the generator is kept constant by increasing the magnetic fluxes flowing in the magnetic poles of the field permanent magnet during low-speed rotation, and weakening the magnetic flux flowing in the field permanent magnet during high-speed rotation.

The field weakening control technique, however, involves controlling the magnitude and phase of current by closely monitoring torque, rotation, and rotation acceleration in some cases, and performing complicate calculations based on these values, and also requires complicated and expensive control circuits including a high-speed computer.

It was revealed that the amount of flux flowing in the stator magnetic poles cannot be reduced to a satisfactory level in a prior-art magnetic brushless d-c motor even by shortcircuiting magnetic poles on the side of the field permanent magnet, as in the case of the aforementioned prior-art generator. That is, as is apparent from the equation for obtaining the maximum rotation $n_{max}=V/\Phi Z$, when $n_{max}$ (also called no-load rotation) is increased by more than twice simply by reducing the total magnetic flux $\Phi$, the total magnetic flux $\Phi$ has to be decreased by more than 50%. In practice, however, the present inventors have found that shortcircuiting magnetic poles on the side of the field permanent magnet can reduce the total magnetic flux $\Phi$ by about 20 to 30% at most. In the conventional type of generator where the magnetic flux bypassing permanent magnet is outside a closed magnetic circuit comprising a rotor and a stator, not only the magnetic flux bypassing permanent magnet hardly contributes to the output of the generator, but also if an electrically conductive and/or magnetic structure exists in the vicinity of the magnetic flux bypassing permanent magnet, eddy current may be produced inside the motor case, etc. due to the magnetic flux produced by the magnetic flux bypassing permanent magnet, or the motor efficiency may be reduced due to the attraction of the magnetic structure. In addition, the generator tends to be of larger size because the flux bypassing permanent magnet is added to standard components of the generator.

SUMMARY OF THE INVENTION

It is an object of the present invention to provide a brushless motor having permanent magnets (for driving automobiles, for example) which can produce sufficiently high torque during low-speed rotation, as in the case of prior-art motors, and can be used with excellent motor efficiency at high torque even in an operation at rotations about three times as high as that of the prior-art motors.

A brushless motor having permanent magnets according to the present invention that can solve the aforementioned problems comprises a stator having a plurality of stator magnetic poles and a winding for generating a rotating magnetic field in the stator magnetic poles, a rotor having a rotating shaft and a field permanent magnet rotatably provided on the rotating shaft with respect to the stator magnetic poles, and a control circuit for detecting the position of the field permanent magnet poles with respect to the stator and feeding a current to the winding in accordance with the detected position; in which the field permanent magnet comprises a first field permanent magnet having magnetic poles of different polarities alternately arranged in the direction of rotation, and a second field permanent magnet having magnetic poles of different polarities alternately arranged in the direction of rotation and adapted to relatively rotate with respect to the first field permanent magnet; the first and second field permanent magnets facing the stator magnetic poles, and a mechanism for changing the synthesized magnetic-pole phase of the first and second field permanent magnets with respect to the magnetic poles of the first field permanent magnet in accordance with the rotation speed of the rotor being provided.

The mechanism for changing the synthesized magnetic-pole phase of the first and second field permanent magnets with respect to the magnetic poles of the first field permanent magnet in accordance with the rotation speed of the rotor should preferably be constructed so that the magnetic poles of the first field permanent magnet are aligned in polarity with those of the second field permanent magnet during low-speed rotor rotation, and shifted from those of the second field permanent magnet during high-speed rotor rotation.

The angle of lead should preferably be changed in accordance with changes in rotation as the synthesized magnetic-pole phase of the first and second field permanent magnets is shifted from the magnetic poles of the first field permanent magnet in the direction of rotation of the rotor.

The mechanism for changing the synthesized magnetic-pole phase of the first and second field permanent magnets with respect to the magnetic poles of the first field permanent magnet in accordance with the rotation of the rotor should preferably use the centrifugal force of the rotor.

Furthermore, according to the present invention there may be provided a brushless motor having permanent magnets comprising a stator having a plurality of stator magnetic poles and a winding for generating a rotating magnetic field on the stator magnetic poles, a rotor having a rotating shaft and a field permanent magnet provided on the rotating shaft in such a manner as to be rotatable with respect to the stator magnetic poles, and a control circuit for detecting the position of the field permanent magnet poles with respect to the stator to feed current in accordance with the position detected; in which the field permanent magnet comprises a first field permanent magnet having magnetic poles of different polarities alternately arranged in the direction of rotation, and a second field permanent magnet having magnetic poles of different polarities alternately arranged in the direction of rotation in such a manner as to be relatively rotatable with respect to the first field permanent magnet; the first and second field permanent magnets facing the stator magnetic poles, and a mechanism for changing the synthesized magnetic-pole phase of the first and second field permanent magnets with respect to the magnetic poles of the first field permanent magnet in accordance with the rotation speed of the rotor having such a construction that the magnetic poles of the same polarity of the first and second field permanent magnets are aligned during low-speed rotation, and are shifted from each other during high-speed rotation.

Moreover, according to the present invention there may be provided a brushless motor having permanent magnets comprising a stator having a plurality of stator magnetic poles and a winding for generating rotating magnetic field on the stator magnetic poles, a rotor having a rotating shaft and a field permanent magnet provided on the rotating shaft in such a manner as to be rotatable with respect to the stator magnetic poles, and a control circuit for detecting the position of the field permanent magnet poles with respect to the stator to feed current in accordance with the position detected; in which the field permanent magnet comprises a first field permanent magnet having magnetic poles of different polarities alternately arranged in the direction of rotation, and a second field permanent magnet having magnetic poles of different polarities alternately arranged in the direction of rotation in such a manner as to be relatively rotatable with respect to the first field permanent magnet; the first and second field permanent magnets facing the stator magnetic poles, a mechanism for changing the synthesized magnetic-pole phase of the first and second field permanent magnets with respect to the magnetic poles of the first field permanent magnet in accordance with the rotation speed of the rotor having such a construction that the magnetic poles of the same polarities of the first and second field permanent magnets are aligned during low-speed rotation, and are shifted from each other during high-speed rotation; and the angle of lead being changed in accordance with changes in rotation as the synthesized magnetic-pole phase of the first and second field permanent magnets is shifted from the magnetic poles of the first field permanent magnet in the direction of the rotor rotation.

Moreover, according to the present invention there may be provided a brushless motor having permanent magnets comprising a stator having a plurality of stator magnetic poles and a winding for generating rotating magnetic field on the stator magnetic poles, a rotor having a rotating shaft and a field permanent magnet provided on the rotating shaft in such a manner as to be rotatable with respect to the stator magnetic poles, and a control circuit for detecting the position of the field permanent magnet poles with respect to the stator to feed current in accordance with the position detected; in which the field permanent magnet comprises a first field permanent magnet having magnetic poles of different polarities alternately arranged in the direction of rotation, and a second field permanent magnet having magnetic poles of different polarities alternately arranged in the direction of rotation in such a manner as to be relatively rotatable with respect to the first field permanent magnet; the first and second field permanent magnets facing the stator magnetic poles, a mechanism for changing the synthesized magnetic-pole phase of the first and second field permanent magnets with respect to the magnetic poles of the first field permanent magnet in accordance with the rotation speed of the rotor having such a construction that the movable shafts of governors connected to each other via elastic members are movable in the forward or backward direction of rotor rotation along guides provided on a fixing member fixed to the rotating shaft, imparting relative rotating force to the second field permanent magnet.

BRIEF DESCRIPTION OF THE DRAWINGS

FIG. 1A illustrating the state where magnetic poles are not shifted, and FIG. 1B the state where magnetic poles are shifted.

FIG. 2A illustrating the state where magnetic poles are not shifted, and FIG. 2B the state where magnetic poles are shifted.

FIG. 3A illustrating the state during low-speed rotation, and FIG. 3B the state during high-speed rotation.

FIG. 6A illustrating the state where magnetic poles are not shifted, and FIG. 6B the state where magnetic poles are shifted.

FIG. 8A illustrating that the magnetizing directions of the field permanent magnets are disposed at certain angles in the radial direction of the rotor core, FIG. 8B the center line of the magnetizing directions of the field permanent magnets are disposed in the radial direction of the rotor core, and FIG. 8C the field permanent magnets are of a semi-cylindrical shape.

FIG. 9A illustrating the state where magnetic poles are not shifted, and FIG. 9B the state where magnetic poles are shifted.

DETAILED DESCRIPTION OF PREFERRED EMBODIMENTS

In the following, the present invention will be described in more detail, FIG. 1 is an exploded perspective view of major parts of a brushless d-c motor having permanent magnets according to the present invention.

Figure 1A:
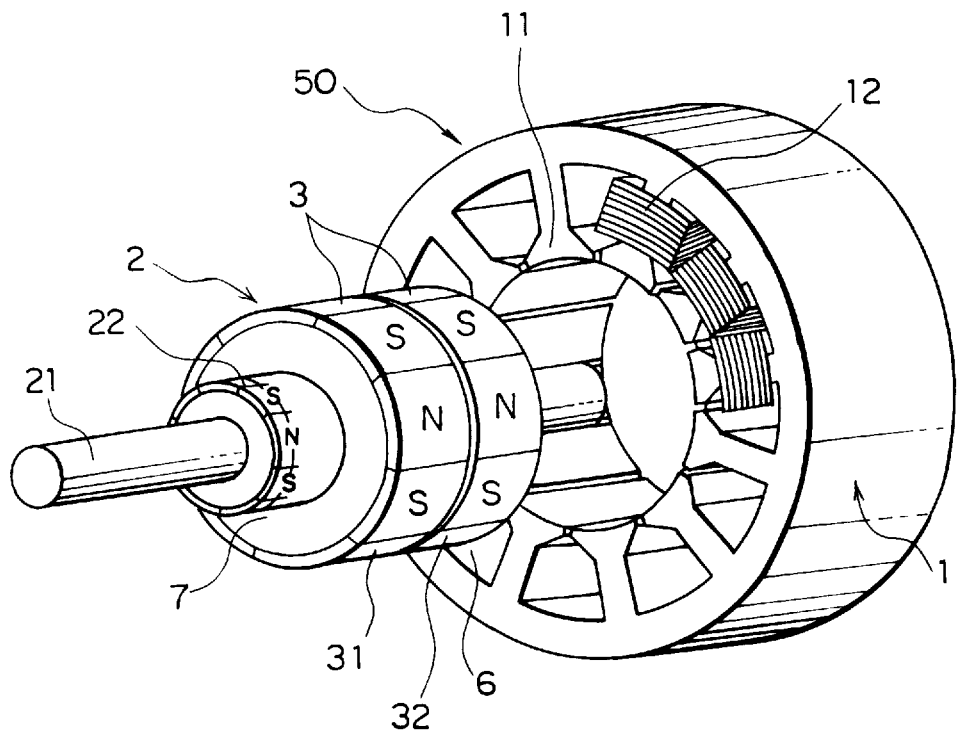
FIGS. 1A and 1B are exploded perspective views of major parts of a brushless motor having permanent magnets embodying the present invention.

In FIG. 1A, a field winding 12 for generating rotating field in a plurality of stator magnetic poles (12 poles in the figure) is wound on a stator 1. A rotor 2 has a rotating shaft 21, a field permanent magnet 3, and a sensor magnet 22 (such as a ferrite bonded magnet) which is fixedly fitted to the rotating shaft 21 and on which a magnetic-pole pattern having the same central angle as the field permanent magnet 3 is formed on the outer circumferential surface thereof to indicate the position of the magnetic poles 4 of the field permanent magnet 3. The field permanent magnet 3 comprises a first field permanent magnet 31 fixedly fitted around the rotating shaft 21 via a ferromagnetic rotor core 7, and a second field permanent magnet 32 which is fixedly fitted to a ferromagnetic rotor core 8 (see FIG. 3) in such a manner as to allow the second field permanent magnet 32 to rotate or pivot with respect to the first field permanent magnet 31. The first and second field permanent magnets 31 and 32 are ring-shaped Nd—Fe—B magnets (anisotropic sintered magnets manufactured by Hitachi Metals, Ltd.: HS40AH, etc.) of the same dimensions on the outer circumferential surface of which eight magnetic poles 4 of sensor different polarities are formed alternately at equal intervals in the direction of rotation. The position of any magnetic pole of the field permanent magnet 3 with respect to the stator 1 is indicated by the sensor magnet 22. A control circuit (not shown) for changing over the current flowing in the field winding 12 in accordance with the position of the magnetic pole is provided to generate a predetermined rotating magnetic field on the stator magnetic pole 11.

As shown in the figure, the first and second field permanent magnets 31 and 32 are disposed facing the stator magnetic poles 11 with a small air gap 6 to constitute a brushless motor having permanent magnets 50 according to the present invention. With this configuration, the magnetic fluxes generated by the first and second field permanent magnets 31 and 32 are efficiently led to the stator magnetic pole 11, acting on the field winding 12. Thus, the leakage flux flowing in the surrounding structures can be reduced to a small level, circumventing the problem of generating losses, such as eddy current, in the surrounding structures.

Figure 1B:
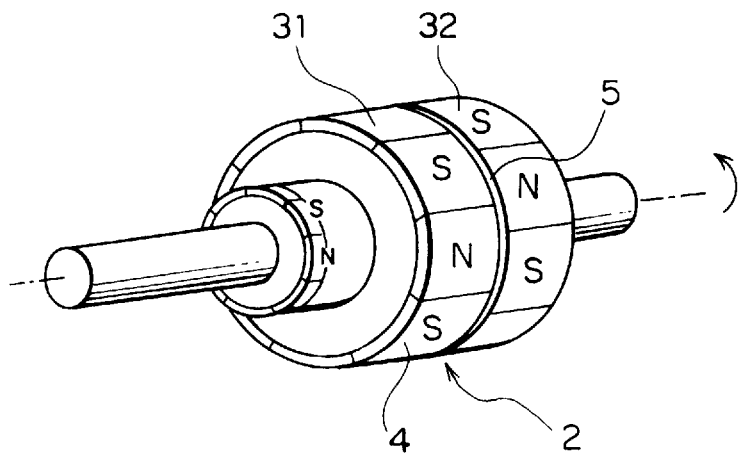

FIG. 1B shows the state where the positions of the first and second field permanent magnets are shifted by rotating the second field permanent magnet 32 relative to the first field permanent magnet 31 in the direction of rotation of the rotor 2. The phase of the synthesized magnetic poles of the first and second field permanent magnets with respect to the magnetic poles of the first field permanent magnet 31 is changed with the rotation of the rotor 2.

The power fed to the field winding 12 is controlled by detecting the magnetic poles of the sensor magnet 22 via a detecting means (not shown), such as a Hall element. In a brushless d-c motor, the maximum torque is theoretically obtained by causing the duration center of the power feeding to the winding for generating rotating magnetic field to agree with the NS changeover point of the field magnetic poles. Widely practiced, however, is a method of advancing the duration center of the power feeding from the NS changeover point of the field magnetic pole in the forward direction of rotation, anticipating the delay in current rising from a power feeding command signal given due to inductance of the rotating field generating winding. The angle for advancing the power feeding duration is generally called the angle of lead. In the present invention, setting the lead angle is also of importance.

Figure 2A:
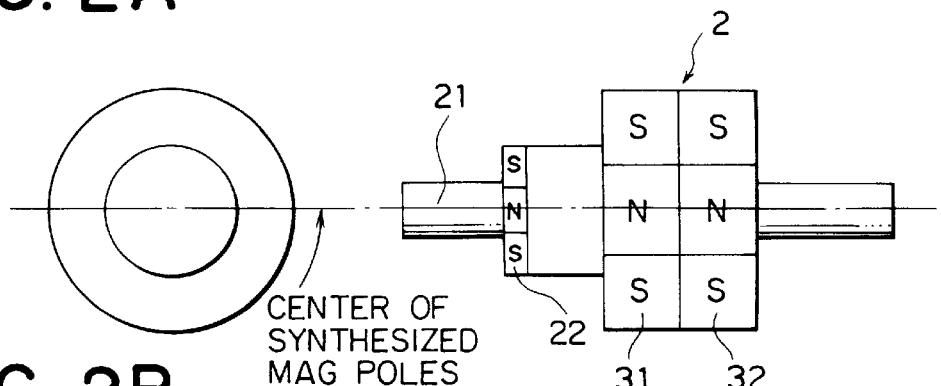
FIGS. 2A and 2B are diagrams explaining the angle of lead of the field permanent magnet magnetic poles in the brushless motor having permanent magnets embodying the present invention.
Figure 2B:
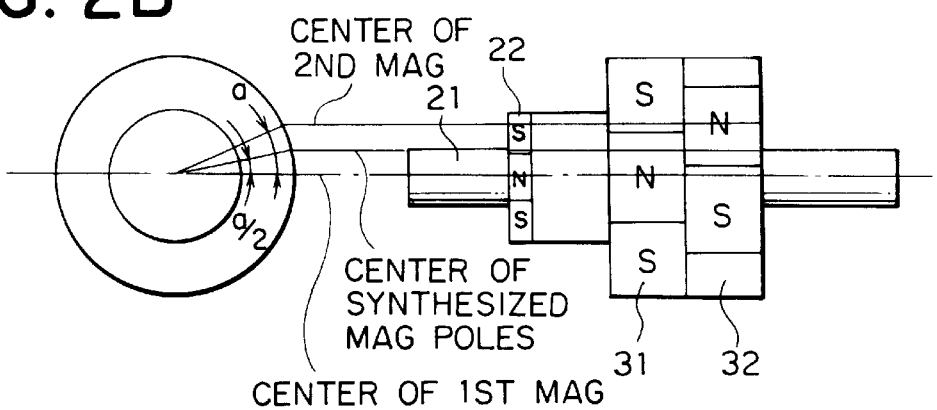

FIGS. 2A and 2B show the relative positions between the magnetic poles of the sensor magnet 22 and the magnetic poles of the first and second field permanent magnets 31 and 32. In FIGS. 1A and 2A where the magnetic poles of the same polarity of the first and second field permanent magnets 31 and 32 are adjacent with each other, the phase of the synthesized magnetic poles of the first and second field permanent magnets 31 and 32 (the center of the synthesized magnetic poles, for example) is in the same phase as that of the magnetic poles (in the center of the magnetic poles, for example) of the sensor magnet 22 and the first field permanent magnet 31. FIGS. 1B and 2B show the state where the second field permanent magnet 32 is shifted from the first field permanent magnet 31 in the forward direction of rotation. Now, assume that the first and second field permanent magnets 31 and 32 generate exactly the same amount of magnetic fluxes, and the second field permanent magnet 32 is shifted from the first field permanent magnet 31 by a degrees in the forward direction of rotation. The phase of the synthesized magnetic poles of the first and second field permanent magnets 31 and 32 becomes the mean value of the magnetic-pole phase of the first and second field permanent magnets 31 and 32. Thus, the phase of the synthesized magnetic poles (the center of the synthesized magnetic poles, for example) is advanced by a lead angle of a/2 degrees in the forward direction of rotation with respect to the phase of the magnetic poles of the first field permanent magnet 31 (the center of the magnetic poles, for example).

By using a mechanism for changing the phase of the synthesized magnetic poles of the first and second field permanent magnets 31 and 32 with respect to the first field permanent magnet 31 with the rotation of the rotor 2, control should preferably be exerted so that the magnetic poles of the same polarity of the first and second field permanent magnets 31 and 32 be aligned as shown in FIG. 1A or 2A when the rotor 2 rotates at low speed, and the magnetic poles of both be shifted in the high-speed rotation of the rotor 2, as shown in FIG. 1B or 2B. That is, when the magnetic poles are shifted, any S pole of the first field permanent magnet 31 and any N pole of the second field permanent magnet 32, and any N pole of the first field permanent magnet 31 and any S pole of the second field permanent magnet 32 are partially overlapped with each other when viewed in the longitudinal direction of the rotating shaft 21. This means that the amount of magnetic fluxes flowing in the field winding 12 on the side of the stator 1 is reduced because a local shortcircuiting of generated magnetic fluxes occurs at portions where the opposite magnetic poles of both are adjacent with each other. That is, the amount of magnetic fluxes is reduced in accordance with the amount of relative shift of magnetic poles between both during high-speed rotation, and the amount of magnetic fluxes flowing in the stator magnetic poles reaches its maximum during low-speed rotation since the magnetic poles of the same polarity of the first and second field permanent magnets 31 and 32 are aligned around the rotating shaft 21.

The brushless motor having permanent magnets 50 according to the present invention comprising the aforementioned construction is capable of controlling the amount of magnetic fluxes flowing in the stator magnetic poles in accordance with a wide range of changes in rotation.

The construction shown in FIG. 1 is such that the magnetic-pole phase of the first field permanent magnet 31 and the sensor magnet 22 is fixed, the second field permanent magnet 32 is rotatable relative to the first field permanent magnet 31, and the magnetic poles of the second field permanent magnet 32 are shifted from those of the first field permanent magnet 31 in the forward direction of rotation during high-speed rotation.

In the present invention, the three components; i.e., the field permanent magnets 31 and 32, and the sensor magnet 22, may be either fixedly or rotatably fitted. For example, there can be a configuration where the magnetic-pole phases of the second field permanent magnet 32 are fixed to the sensor magnet 22, while the magnetic poles of the second field permanent magnet 32 are shifted from the magnetic poles of the first field permanent magnet 31 in the forward direction of rotation during high-speed rotation.

There can also be another configuration where the magnetic-pole phases of the second field permanent magnet 32 and the sensor magnet 22 are fixed, while the magnetic poles of the second field permanent magnet 32 are shifted from the magnetic poles of the first field permanent magnet 31 in the backward direction of rotation during high-speed rotation.

Furthermore, there can also be still another configuration where the magnetic-pole phases of the first field permanent magnet 31 and the sensor magnet 22 are fixed, while the magnetic poles of the second field permanent magnet 32 are shifted from the magnetic poles of the first field permanent magnet 31 in the backward direction of rotation during high-speed rotation.

When the ratio of the amount of magnetic fluxes in the first and second field permanent magnets 31 and 32 in the state shown in FIG. 1A is set to 1:2 as an example where the amount of generated magnetic fluxes in the first and second field permanent magnets 31 and 32 are set to different values, the rate of change in the amount of magnetic fluxes in the field winding 12 can be increased, compared with the ratio of 1:1, through the same magnetic-pole shifting operation.

Furthermore, the angle of lead can be changed during high-speed or low-speed rotation, independently of rotation by providing a separate phase changing mechanism on the sensor magnet 22, or there can be provided a configuration where the lead angle is not changed substantially during low-speed and high-speed rotation.

As a mechanism for changing the phase of the synthesized magnetic poles of the first and second field permanent magnets 31 and 32 with respect to the magnetic poles of the first field permanent magnet 31 with the rotation of the rotor 2, the construction shown in FIG. 3 is desirable.

Figure 3A:
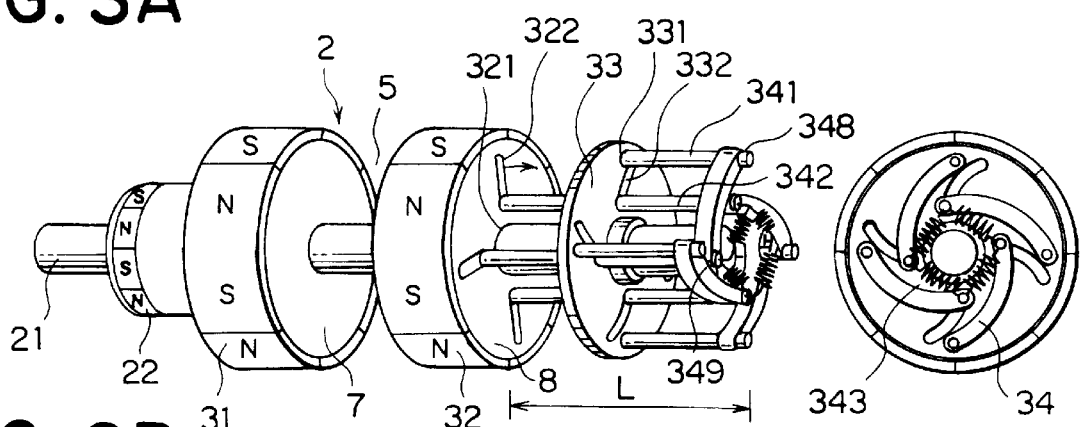
FIGS. 3A and 3B are exploded perspective views of a mechanism for changing the synthesized magnetic-pole phase of the first and second field permanent magnets with respect to the rotor rotation in the brushless motor having permanent magnets embodying the present invention.
Figure 3B:
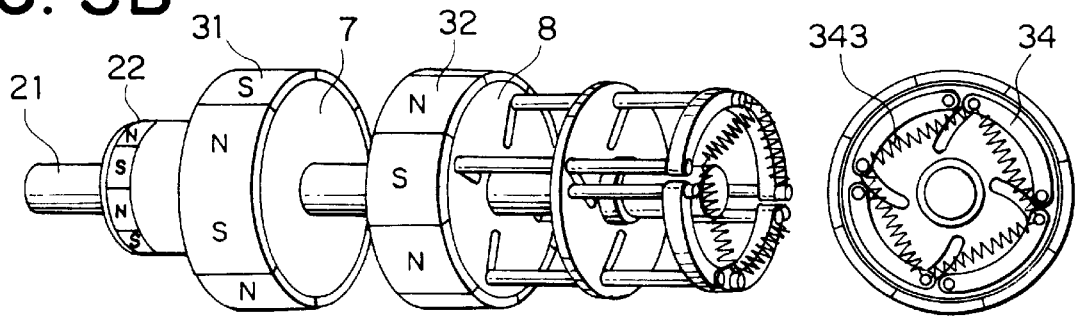

In FIG. 3, the first field permanent magnet 31 is fixedly fitted to the rotating shaft 21, and the second field permanent magnet 32 is adapted to rotate by a predetermined amount around the rotating shaft 21 which is inserted rotatably through a shaft hole 321 provided in the center thereof. A gap 5 of a few millimeters should preferably be provided between the first and second field permanent magnets 31 and 32 so as to prevent the attraction and repulsion forces from interfering with the aforementioned magnetic-pole shifting operation. A governor fixing plate 33 is fixed to the rotating shaft 21, and auxiliary rotating shafts 341 are fitted to four holes 331 provided symmetrically at intervals of 90 degrees in central angle on the end face of the governor fixing plate 33. The governors 34 are essentially circular arc-shaped components, each having through holes 348 and 349 on both ends thereof, with an auxiliary rotating shaft 341 fitted to the through hole 348 and a movable shaft 342 fitted to the through hole 349 to hold each of the governors 34. Furthermore, four circular arc-shaped slotted holes 332 are provided in point symmetry with respect to the holes 331. Four slotted grooves 322 are provided symmetrically in the radial direction at intervals of 90 degrees in central angle on an end face of the rotor core 8. The movable shaft 342 is inserted in each of the slotted holes and the slotted grooves in such a manner that the four movable shafts 342 connected with each other via springs 343 attract each other by the resiliency of the springs 343. The movable shaft 342 of the governor 34 is held by the tension of the spring 343 at a position nearest to the rotating shaft 21 in the slotted hole 332 when the rotor 2 rotates at low speed, as shown in FIG. 3A. In this state, the magnetic poles of the same polarity of the first and second field permanent magnets 31 and 32 are adapted to be aligned. With increase in the rotation of the rotor 2, the governor 34 is opened by centrifugal force into a state shown in FIG. 3B, and the movable shaft 342 of the governor 34 moves toward the outer periphery along the slotted hole 332, that works as a guide for the movable shaft 342, on the governor fixing plate 33. At the same time, the second field permanent magnet 32 is caused to rotate in the direction shown by an arrow with respect to the first field permanent magnet 31 since the slotted groove 322 is disposed shifted with respect to the slotted hole 332 in the direction of rotation toward the outer periphery of the rotor 2, allowing the portion of the movable shaft 342 which is inserted into the slotted groove 322 to move the rotor core 8 in the direction shown by an arrow via the slotted groove 322. With decrease in the rotation of the rotor 2 and accordingly the centrifugal force, the governor 34 is closed by the tension of the spring 343 into a state shown in FIG. 3A, returning to a position where the magnetic poles of the same polarity of the first and second field permanent magnets 31 and 32 are aligned.

As described above, the mechanism for causing the second field permanent magnet 32 to rotate around the rotating shaft 21 by a predetermined amount with respect to the first field permanent magnet 31, which is operated by the centrifugal force working on the constituent components of the rotor 2 without any control and power from the outside, can accomplish the control of the amount of magnetic fluxes of the brushless motor having permanent magnets with ease and at low cost, using a simple mechanism.

Since slotted grooves 322 are provided on the rotor core 8, as described above, the axial distance (L) from the slotted groove 322 to the governor 34 can be reduced. Moreover, high torque and high motor efficiency can be accomplished over a wide range of rotation, as will be shown later in the description of examples, by properly setting the spring constant of the spring 343 so that the aforementioned magnetic-pole shifting operation can be achieved at a predetermined rotation, taking into consideration the centrifugal force.

EXAMPLES A–D

Figure 4:
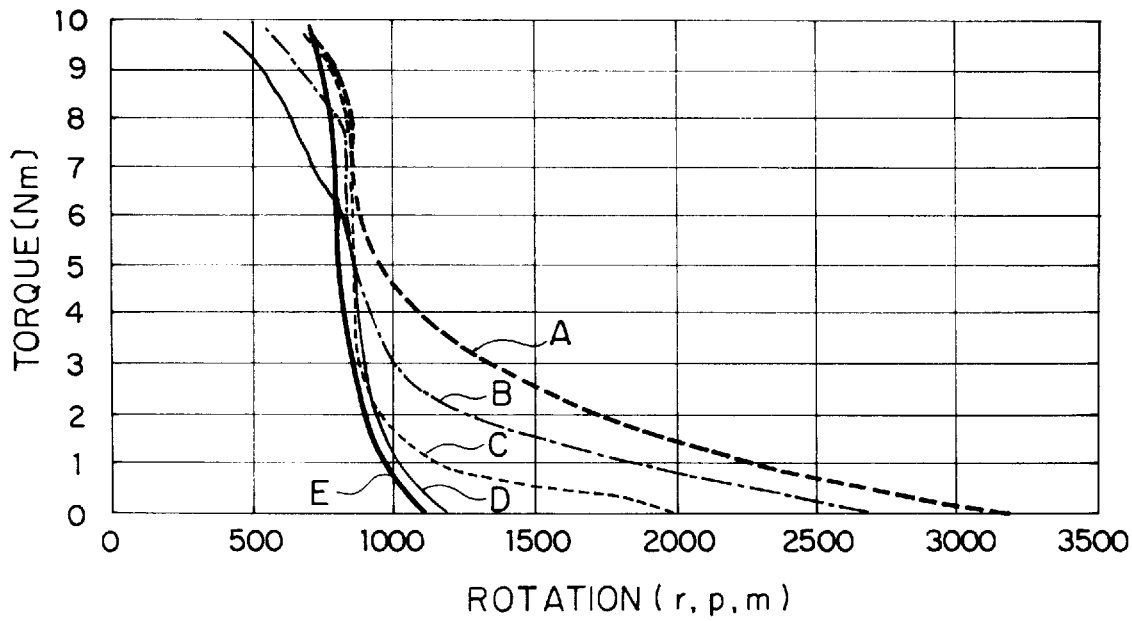
FIG. 4 is a diagram showing typical rotation-torque characteristics for brushless motors having permanent magnets embodying the present invention and of the prior art.
Figure 5:
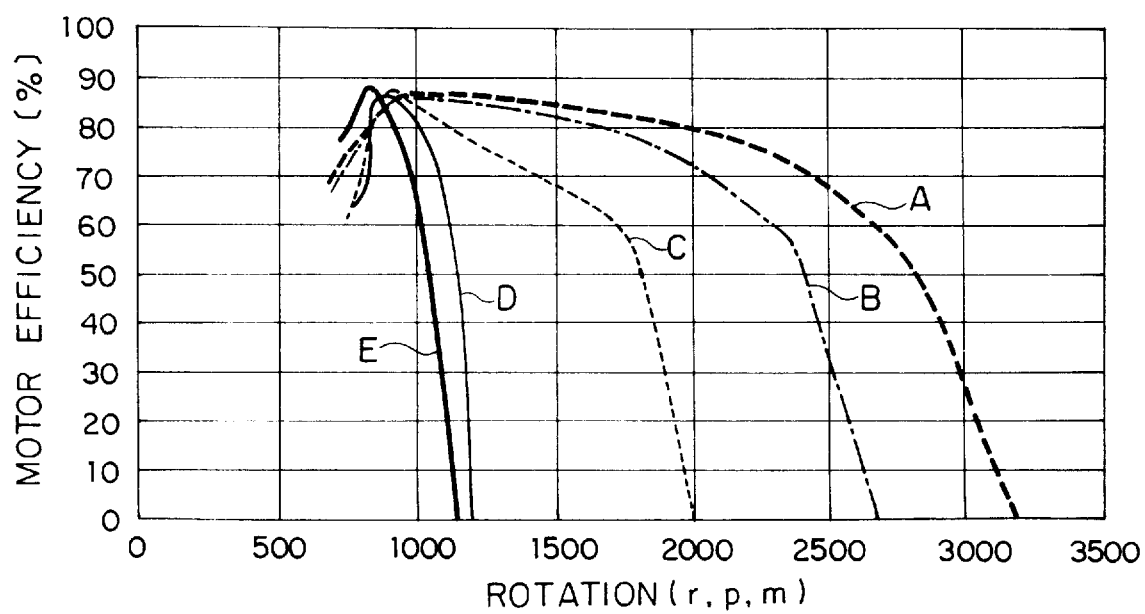
FIG. 5 is a diagram showing typical rotation-motor efficiencys for brushless motors having permanent magnets embodying the present invention and of the prior art.

The rotation-torque characteristics when the rate of decrease in the amount of single-pole effective magnetic fluxes and the lead angle were changed simultaneously by means of the aforementioned magnetic-pole shifting mechanism under the conditions given in Table 1 below, with the brushless motor having permanent magnets 50 according to the present invention, in which Nd—Fe—B radially anisotropic ring magnets (HS-30BR, outside dia.: 74 mm, axial length: 23 mm) manufactured by Hitachi Metals, Ltd. were used as the first and second field permanent magnets 31 and 32, and the air gap 6 was set to 0.5 mm, are shown in FIG. 4, and the rotations-motor efficiency is shown in FIG. 5. The amount of single-pole effective magnetic fluxes used herein means the maximum amount of magnetic flux flowing in one magnetic pole of an armature from a magnet rotor.

CONVENTIONAL EXAMPLE: E

The rotations-torque characteristics and the rotations-motor efficiency of a conventional brushless motor having permanent magnets, in which the same magnets as used in the above examples were used as the first and second field permanent magnets, evaluated under almost the same conditions as the above examples, except that the second field permanent magnet was fixedly fitted to the rotating shaft so that the magnetic poles of the second field permanent magnet were aligned in polarity with those of the first field permanent magnet, and that the lead angle was fixed at 5.5 degrees, are also shown in FIG. 4 and FIG. 5, respectively.

TABLE 1

| | Lead angle during low-speed rotation (deg.) | Magnetic-pole shift (deg.) | Lead angle during high-speed rotation (deg.) | Rate of decrease in the amount of single-pole effective magnetic fluxes (%) |
|---|---|---|---|---|
| Example A | 20 | 0 → 28 | 6 | 34 |
| Example B | 15 | 0 → 28 | 1 | 34 |
| Example C | 10 | 0 → 28 | −4 | 34 |
| Example D | 5.5 | 0 → 28 | −8.5 | 34 |
| Conventional Example E | 5.5 | 0 → 0 | 5.5 | 0 |

FIGS. 4 and 5, and Table 1 will be described in the following, taking the brushless motor having permanent magnets in Example A as a typical example. The motor was set such that the lead angle for low-speed rotation was at 20 degrees when the motor rotation was less than 1000 rpm, and the lead angle for high-speed rotation was at six degrees when the magnetic-pole shift was 28 degrees (max.) as the motor rotation increased to more than 1000 rpm. That is, when the motor rotated at less than 1000 rpm, the lead angle of the sensor was set to 20 degrees in the state where the poles of the same polarity of the first and second field permanent magnets 31 and 32 were aligned with no phase shifting of the magnetic poles of the first and second field permanent magnets 31 and 32. As the motor rotation rose to more than 1000 rpm, the second field permanent magnet 32 rotated by 28 degrees with respect to the first field permanent magnet 31 in the direction of rotation of the rotor 2 by the action of the centrifugal force of the governor 34, advancing the phase of the synthesized magnetic poles of the first and second field permanent magnets 31 and 32 by half the phase of the magnetic poles of the second field permanent magnet 32. Consequently, the lead angle lags that much behind. When the magnetic-pole shift of the second field permanent magnet 32 reaches its maximum of 28 degrees, the lead angle is delayed 14 degrees, half of the magnetic-pole shift, to six degrees. The decrease amount in single-pole effective magnetic fluxes at this time is 34% (100% →66%). Thus, it was found that both the torque and the motor efficiency are improved over a wide range of rotation, compared with Conventional Example E.

With Examples B, C and D, too, it was found that higher torque and motor efficiency can be achieved over a wide range of rotation, compared with Conventional Example E. Furthermore, when comparing Examples A, B, C and D, it was found that the larger the lead angle for low-speed rotation, the higher torque and motor efficiency can be achieved over a wide range of rotation.

As is apparent from FIGS. 4 and 5, the brushless motor having permanent magnets according to the present invention can increase no-load rotation ($n_{max}$) by a factor of 2.8, compared with motors of conventional specifications, without sacrificing the rated torque (7 Nm) and the maximum efficiency. High torque and motor efficiency can also be obtained with the brushless motor having permanent magnets according to the present invention.

When a magnetic-pole pattern of symmetrical n poles is formed on the outer circumferential surface of the field permanent magnets 31 and 32, the angle of the aforementioned magnetic-pole shift, θ (degree) should preferably be $x/2 \leq \theta \leq 0.8 \ x$ assuming that the central angle of each magnetic pole of the n poles is x (degrees). This is partly because the rate of decrease in the amount of single-pole effective magnetic fluxes due to the magnetic-pole shift caused by increased rotation cannot be maintained above 30% when θ is less than x/2 degrees, and partly because a rotating force in the reverse direction may be generated when θ exceeds 0.8 x degrees, causing a trouble in the magnetic-pole shifting mechanism according to the present invention.

The lead angle, α (degrees), should preferably be $0 < \alpha \leq x/2$. This is because the upper limit is evident from the definition of the lead angle, and the lower limit can be any controllable value excluding 0.

In the foregoing, description has been made about examples where the amount of single-pole effective magnetic flux is reduced by 34% by changing the magnetic-pole shifting operation and the angle of lead simultaneously, or changing the magnetic-pole shifting operation alone. According to the present invention, however, it is quite easy to set the rate of decrease in the amount of single-pole effective magnetic fluxes to more than 30%. Furthermore, it is possible to increase the rate of decrease more preferably to more than 40% or more preferably to 50%.

In the aforementioned examples embodying the present invention, identical symmetrical eight-magnetic-pole patterns are formed on the outer circumferential surface of the first and second field permanent magnets. The patterns of the magnets, however, may be of the unsymmetrical one and the same. In addition, although the present invention does not necessarily limit the number of magnetic poles, preferably magnetic poles of 2 to 128 poles, or more preferably those of 4 to 32 poles would be useful. The first and second field permanent magnets may have different magnetic-pole patterns. By setting the ratio of the amounts of magnetic fluxes generated in the state where the magnetic poles of the same polarity of the first and second field permanent magnets are aligned to a different appropriate value, it is possible to operate the motor at high speed and change the amount of magnetic fluxes more greatly through a single magnetic-pole shifting operation.

In the aforementioned examples embodying the present invention, two field permanent magnets disposed on the same shaft are used, and the amount of magnetic fluxes of the brushless motor having permanent magnets is reduced in accordance with changes in revolution by causing one of the two field permanent magnets to relatively rotate with respect to the other. The present invention may have such a construction that more than three field permanent magnets are provided, one or more than two of which are fixedly fitted to the rotating shaft, with the remaining field permanent magnets caused to relatively rotate.

In the present invention, the shape, dimensions and number of field permanent magnets are not limited, but any field permanent magnets can be provided on the rotor core so that magnetic poles of different polarities are formed alternately in the direction of rotation on the outer circumferential surface of the rotor. For example, the rotor 2 may be substituted by disposing arc-segment magnets continuously in a ring shape in the direction of rotation on the outer circumferential surface of the rotor core disposed facing the stator, or disposing a sufficient number of arc-segment magnets to form a predetermined number of magnetic poles at predetermined intervals in the direction of rotation on the outer circumferential surface of the rotor core. The rotor 2 may be covered with a thin non-magnetic cylinder disposed on the outer circumferential surface of the field permanent magnets shown in FIG. 1.

In the following, embodiments of these configurations will be described.

Figure 6A:
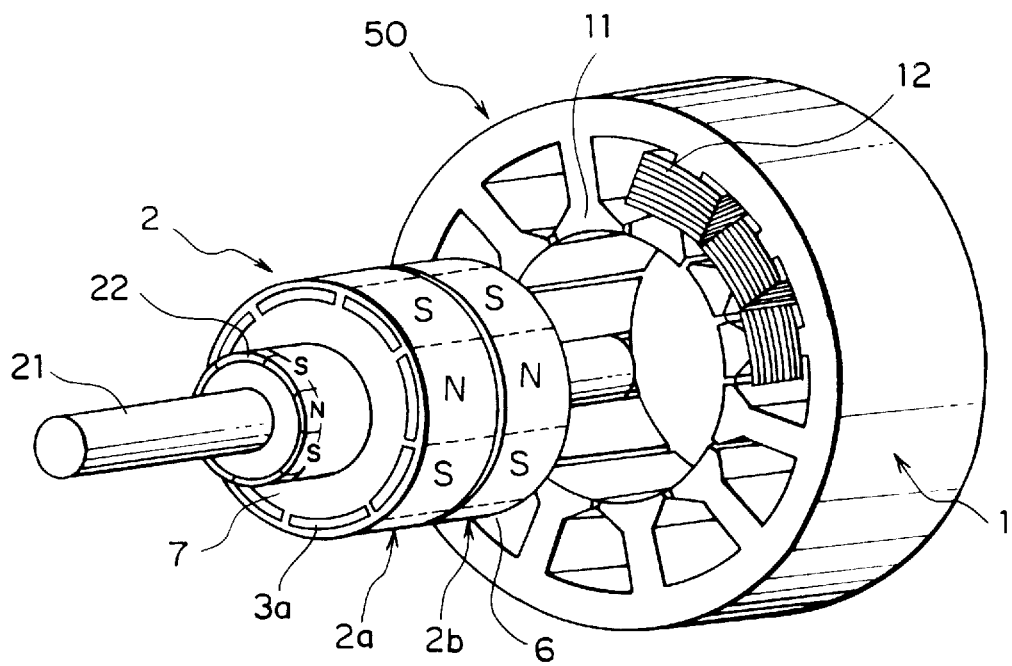
FIGS. 6A and 6B are exploded perspective views of major parts of another embodiment of a brushless motor having permanent magnets inside the rotor according to the present invention.
Figure 6B:
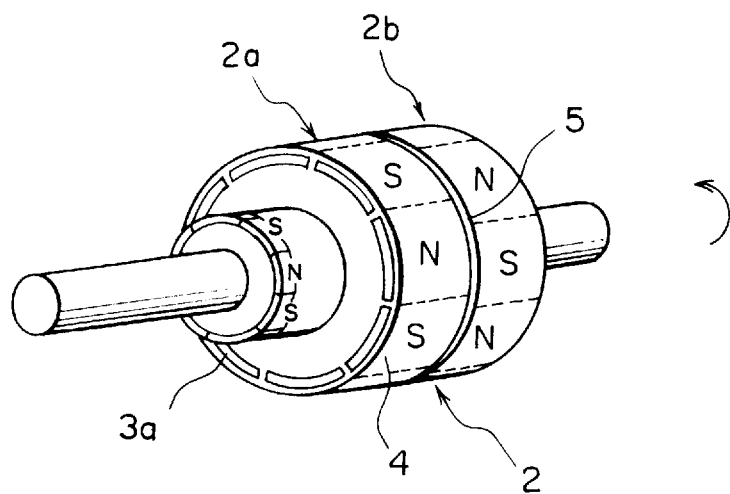

FIG. 6 is an exploded perspective view of major parts of a brushless d-c motor having permanent magnets inside the rotor which is another embodiment of the present invention, FIG. 6A illustrating the state where magnetic poles are not shifted and FIG. 6B the state where magnetic poles are shifted. In the figure, like parts are indicated by like numerals and symbols used in FIGS. 1 through 3.

The rotor 2 comprises a first internal magnetic rotor 2a and a second internal magnetic rotor 2b that can be relatively rotated with respect to the first internal magnetic rotor 2a. The first and second internal magnetic rotors 2a and 2b have first and second segment type field permanent magnets 3a (both being Nd—Fe—B anisotropic sintered magnets: HS37BH, manufactured by Hitachi Metals, Ltd.) embedded in through holes that are provided in a quantity corresponding to the number of magnetic poles along the rotating shaft 21 on the ferromagnetic rotor cores 7 (SS400, for example). As a result, a total of eight N and S magnetic poles 4 are provided alternately at equal intervals in the direction of rotation on the outer circumferential surface of the rotor cores 7.

With this arrangement, the segment type field permanent magnets, which are fixedly fitted to the inside of the first and second rotor cores 7, can be prevented from peeling off even during high-speed rotation. Although the aforementioned internal magnetic rotors 2a and 2b have arc-segment type magnets, field permanent magnets of other shapes may of course be employed.

Figure 7:
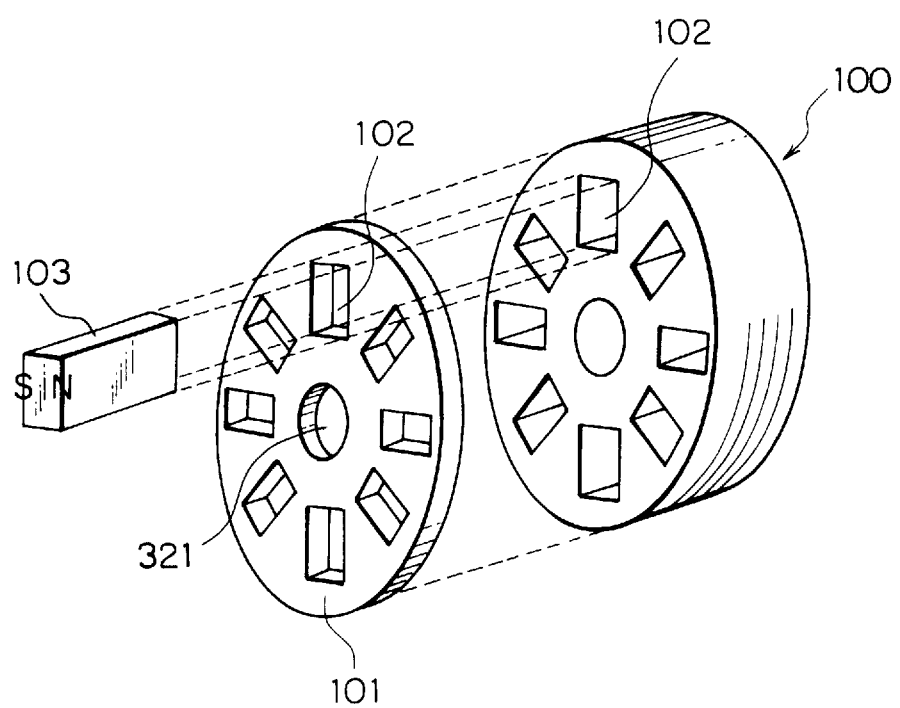
FIG. 7 is a diagram showing another embodiment of the rotor having permanent magnets inside the rotor used in the present invention.

FIG. 7 shows an internal magnetic rotor 100 formed by stacking a plurality of 0.45-mm thick ferromagnetic sheets (made of silicon steel, for example) 101 having a hole 321 through which the rotating shaft (not shown) provided at the center thereof, and holes 102 for embedding a corresponding number of block-shaped field permanent magnets 103 to magnetic poles along the rotating shaft, with the field permanent magnets 103 inserted into the holes 102.

Figure 8A:
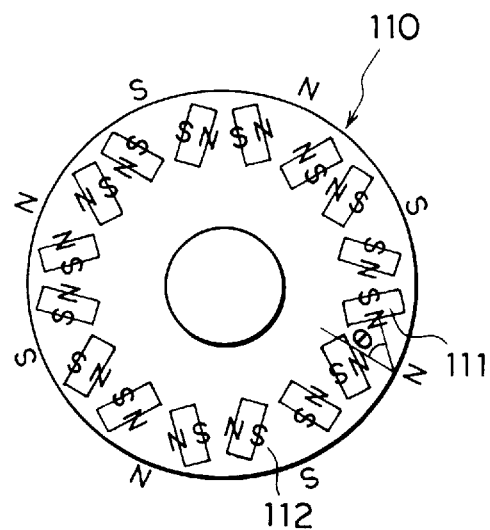
FIGS. 8A–8C are cross-sectional views of major parts of still other embodiments of the rotor having permanent magnets inside the rotor used in the present invention.

FIG. 8A shows still another embodiment of the internal magnetic rotor 110 in which the magnetizing direction of the field permanent magnets 111 is oriented at an angle θ'(0<θ'<90 degrees) with respect to the radial direction of the rotor core 112. With this arrangement, two field permanent magnets 111 form one magnetic pole provided on the outer circumferential surface of the rotor core 112, with the poles of the same polarity of the opposing two field permanent magnets forming one magnetic pole. This arrangement has an advantage that the amount of effective magnetic fluxes per magnetic pole can be changed freely by changing the angle θ.

Figure 8B:
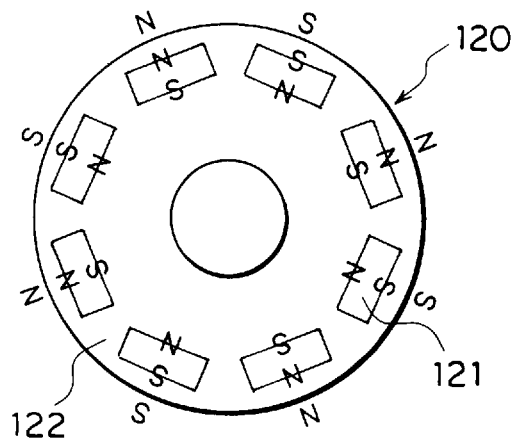

As still another embodiment of the internal magnet type rotor 120, FIG. 8B shows the case where the demagnetizing direction of the field permanent magnets 121 is oriented in parallel with the radial direction of the rotor core 122. With this arrangement, the field permanent magnets 121 which are disposed inside the rotor core 122 can produce the amount of effective magnetic fluxed close to that with the surface mounted magnet type rotor.

Figure 8C:
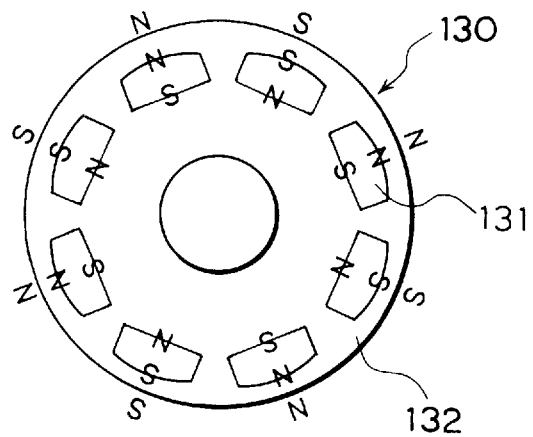

FIG. 8C is a cross-sectional view of further another embodiment of the internal magnet type rotor 130 where the filed magnet 131 is of a semi-cylindrical cross-sectional shape. This embodiment, in which the thickness of the central part of the field permanent magnet 131 is thicker than that of both edges thereof, has an advantage that when the rotor 130 is incorporated in the brushless motor having permanent magnets according to the present invention, the distribution of the effective magnetic fluxes in the direction of rotation of the rotor 130 in an air gap approaches to a sine wave.

Figure 9A:
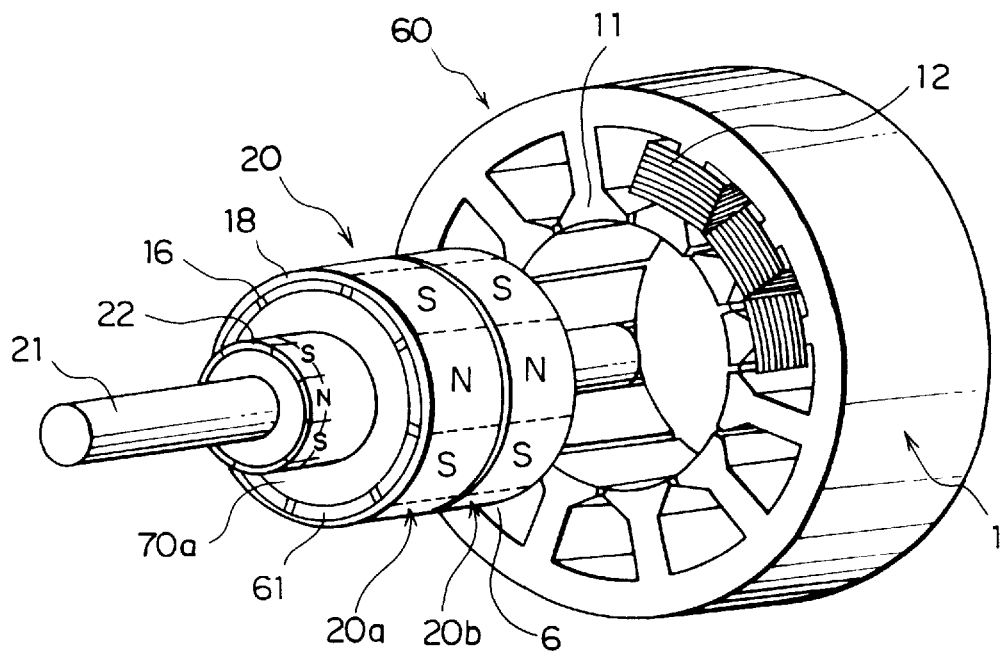
FIGS. 9A and 9B are exploded perspective views of major parts of still another embodiment of the brushless motor having permanent magnets according to the present invention using a magnet rotor with a cylindrical cover.
Figure 9B:
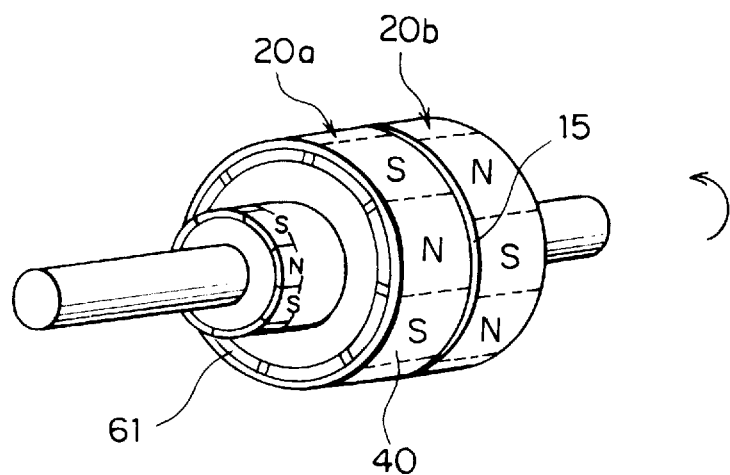

FIG. 9 is an exploded perspective view of major parts of a brushless d-c motor having a magnet rotor with a cylindrical cover as still another embodiment of the present invention. In the figure, like parts are indicated by like numerals shown in FIG. 6.

Two rotors 20a and 20b employed in the brushless d-c motor 60 shown in FIG. 9 have such a construction that arc-segment first and second field permanent magnets 61 are disposed in a quantity corresponding to the number of magnetic poles in the direction of rotation on the outer circumferential surface of ferromagnetic rotor cores 70a via an air gap 16, with a non-magnetic cylindrical cover 18 (made of SUS304, for example) disposed thereon to reinforce the field permanent magnets. As a result, the field permanent magnets are prevented from peeling off even when the motor is operated at high speed.

The cylindrical cover 18 used herein may be made of a ferromagnetic material (carbon steel, for example). The cylindrical cover 18 may also comprise a ferromagnetic component and a non-magnetic component, with the ferromagnetic and non-magnetic components made of the same material having different crystalline structures.

Figure 10:
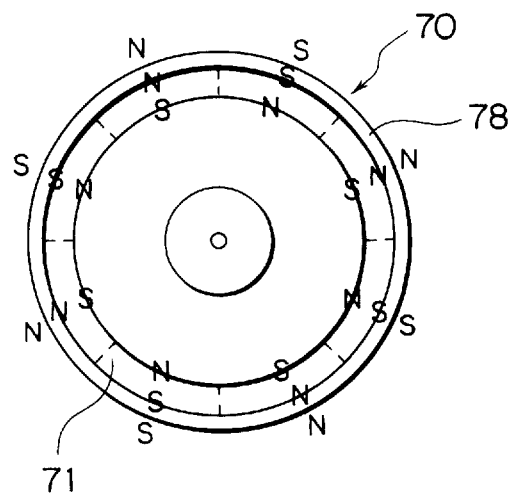
FIG. 10 is a diagram of further another embodiment of the magnet rotor with a cylindrical cover.
Figure 11:
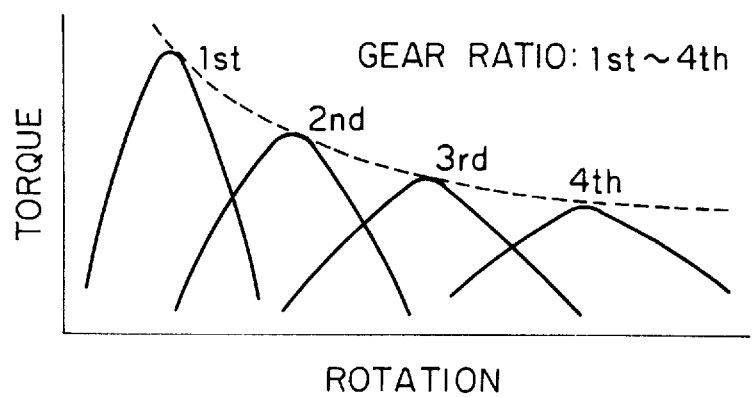
FIG. 11 is an output characteristic diagram of an internal combustion engine with transmission gear.
Figure 12:
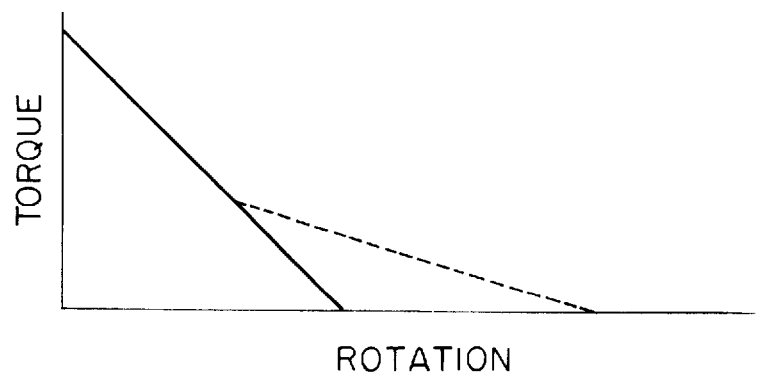
FIG. 12 is a characteristic diagram of a prior-art brushless d-c motor.

FIG. 10 shows still another embodiment of a magnet rotor with a cylindrical cover used in the aforementioned brushless motor 60.

In the magnet rotor 70 with a cylindrical cover 78 shown in FIG. 10, radially anisotropic magnets or multipolar anisotropic magnets of an integral ring are used as field permanent magnets 71, in place of the aforementioned arc-segment magnets 61. As a result, the magnet rotor 70 can be assembled easily.

Although the aforementioned embodiments have such a construction that the movable shafts of the governors are linked to each other via springs, various known types of springs may be used as the springs. Various known kinds of rubber may be used instead of the springs, or a combination of springs and rubber may of course be employed.

As described above, the brushless motor having permanent magnets according to the present invention can achieve high torque during low-speed rotation, as in the case of conventional types of motors, and can be operated at improved efficiency with high torque at rotations almost three times as high as that of the conventional types. Thus, the brushless motor having permanent magnets according to the present invention is useful as a prime mover for automobiles substituting for internal combustion engines.

What is claimed is:

1. A brushless motor having permanent magnets comprising:
    a stator having a plurality of stator magnetic poles and a winding for generating a rotating field in the stator magnetic poles;
    a rotor having a rotating shaft and field permanent magnets rotating with respect to the stator magnetic poles;
    a control circuit for detecting the position of magnetic poles of the field permanent magnet with respect to the stator and feeding current to the winding in accordance with the position;
    wherein the field permanent magnets comprise a first field permanent magnet having magnetic poles of different polarities alternately arranged in the direction of rotation, and a second field permanent magnet that is adapted to be rotatable with respect to the first field permanent magnet and has magnetic poles of different polarities alternately arranged in the direction of rotation; the first and second field permanent magnets facing the stator magnetic poles; and
    a mechanism for changing the phase of the synthesized magnetic poles of the first and second field permanent magnets in accordance with the rotation of the rotor is provided.

2. A brushless motor having permanent magnets as set forth in claim (1); wherein the mechanism for changing the phase of the synthesized magnetic poles of the first and second field permanent magnets in accordance with the rotation of the rotor is adapted to align the magnetic poles of the same polarity of the first and second field permanent magnets when the rotor rotates at low speed and shift the magnetic poles when the rotor rotates at high speed.

3. A brushless motor having permanent magnets as set forth in claim (1); wherein the phase of the synthesized magnetic poles of the first and second field permanent magnets is shifted in the direction of rotation with respect to the phase of the first field permanent magnet to cause the lead angle to change with the rotation of the rotor.

4. A brushless motor having permanent magnets as set forth in claim (1); wherein the mechanism for changing the phase of the synthesized magnetic poles of the first and second field permanent magnets in accordance with the rotation of the rotor is adapted to used the centrifugal force of the rotor.

5. A brushless motor having permanent magnets comprising:
    a stator having a plurality of stator magnetic poles and a winding for generating a rotating field in the stator magnetic poles;
    a rotor having a rotating shaft and field permanent magnets rotating with respect to the stator magnetic poles;
    a control circuit for detecting the position of magnetic poles of the field permanent magnet with respect to the stator and feeding current to the winding in accordance with the position;
    wherein the field permanent magnets comprise a first field permanent magnet having magnetic poles of different polarities alternately arranged in the direction of rotation, and a second field permanent magnet that is adapted to be rotatable with respect to the first field permanent magnet and has magnetic poles of different polarities alternately arranged in the direction of rotation; the first and second field permanent magnets facing the stator magnetic poles; and
    a mechanism for changing the phase of the synthesized magnetic poles of the first and second field permanent magnets in accordance with the rotation of the rotor is provided; the mechanism being adapted to use the centrifugal force of the rotor to cause the magnetic poles of the same polarity of the first and second field permanent magnets to align during low-speed rotation and cause the magnetic poles to shift from the aligned state thereof during high-speed rotation is provided.

6. A brushless motor having permanent magnets comprising:
    a stator having a plurality of stator magnetic poles and a winding for generating a rotating field in the stator magnetic poles;

a rotor having a rotating shaft and field permanent magnets rotating with respect to the stator magnetic poles;

a control circuit for detecting the position of magnetic poles of the field permanent magnet with respect to the stator and feeding current to the winding in accordance with the position;

wherein the field permanent magnets comprise a first field permanent magnet having magnetic poles of different polarities alternately arranged in the direction of rotation, and a second field permanent magnet that is adapted to be rotatable with respect to the first field permanent magnet and has magnetic poles of different polarities alternately arranged in the direction of rotation; the first and second field permanent magnets facing the stator magnetic poles; and a mechanism for changing the phase of the synthesized magnetic poles of the first and second field permanent magnets in accordance with the rotation of the rotor is provided; the mechanism being adapted to use the centrifugal force of the rotor to cause the magnetic poles of the same polarity of the first and second field permanent magnets to align during low-speed rotation and cause the magnetic poles to shift from the aligned state thereof during high-speed rotation is provided; the phase of the synthesized magnetic poles of the first and second field permanent magnets being shifted in the direction of rotation with respect to the phase of the first field permanent magnet to cause the lead angle to change with the rotation of the rotor.

7. A brushless motor having permanent magnets comprising:

a stator having a plurality of stator magnetic poles and a winding for generating a rotating field in the stator magnetic poles;

a rotor having a rotating shaft and field permanent magnets rotating with respect to the stator magnetic poles;

a control circuit for detecting the position of magnetic poles of the field permanent magnet with respect to the stator and feeding current to the winding in accordance with the position;

wherein the field permanent magnets comprise a first field permanent magnet having magnetic poles of different polarities alternately arranged in the direction of rotation and a second field permanent magnet having magnetic poles of different polarities alternately arranged in the direction of rotation and adapted to be rotatable with respect to the first field permanent magnet; the first and second field permanent magnets facing the stator magnetic poles; and a mechanism for changing the phase of the synthesized magnetic poles of the first and second field permanent magnets in accordance with the rotation of the rotor is provided; the mechanism having such a construction that movable shafts of governors connected to each other via elastic members are movable in the forward or backward directions of rotation of the rotor along guides provided on a fixing member fixed to the rotating shaft, imparting relative rotating force to the second field permanent magnet.

* * * * *